Oct. 24, 1967  A. F. CUMMINGS  3,348,352
FOLDABLE STRUCTURE
Filed April 16, 1964  9 Sheets-Sheet 1
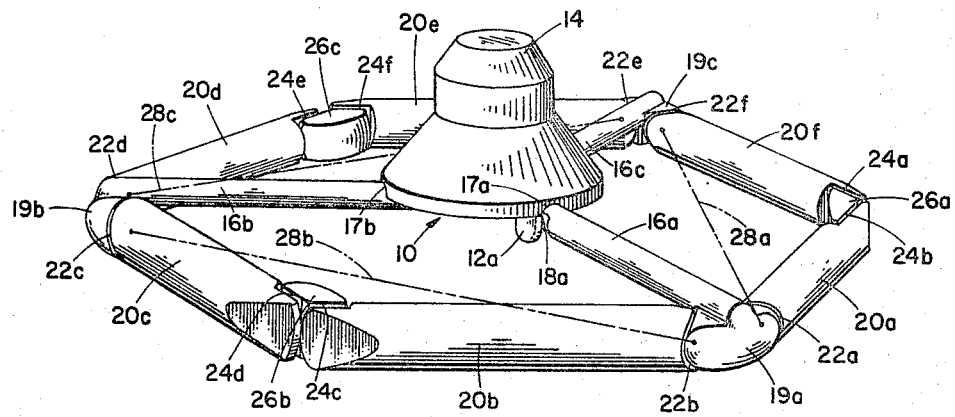
FIG. 1
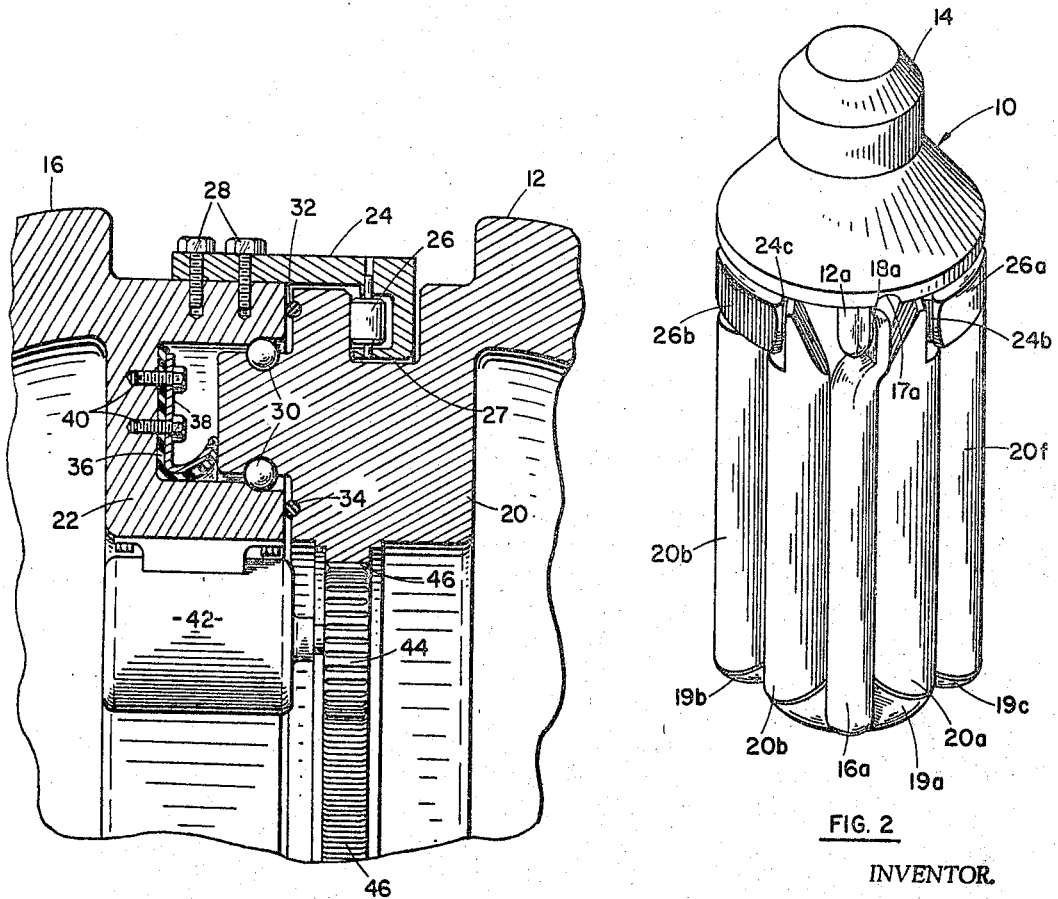
FIG. 4
FIG. 2
INVENTOR.
ALAN F. CUMMINGS
BY
ATTORNEY Oct. 24, 1967   A. F. CUMMINGS   3,348,352
FOLDABLE STRUCTURE
Filed April 16, 1964   9 Sheets-Sheet 2

INVENTOR.
ALAN F. CUMMINGS
BY
ATTORNEY

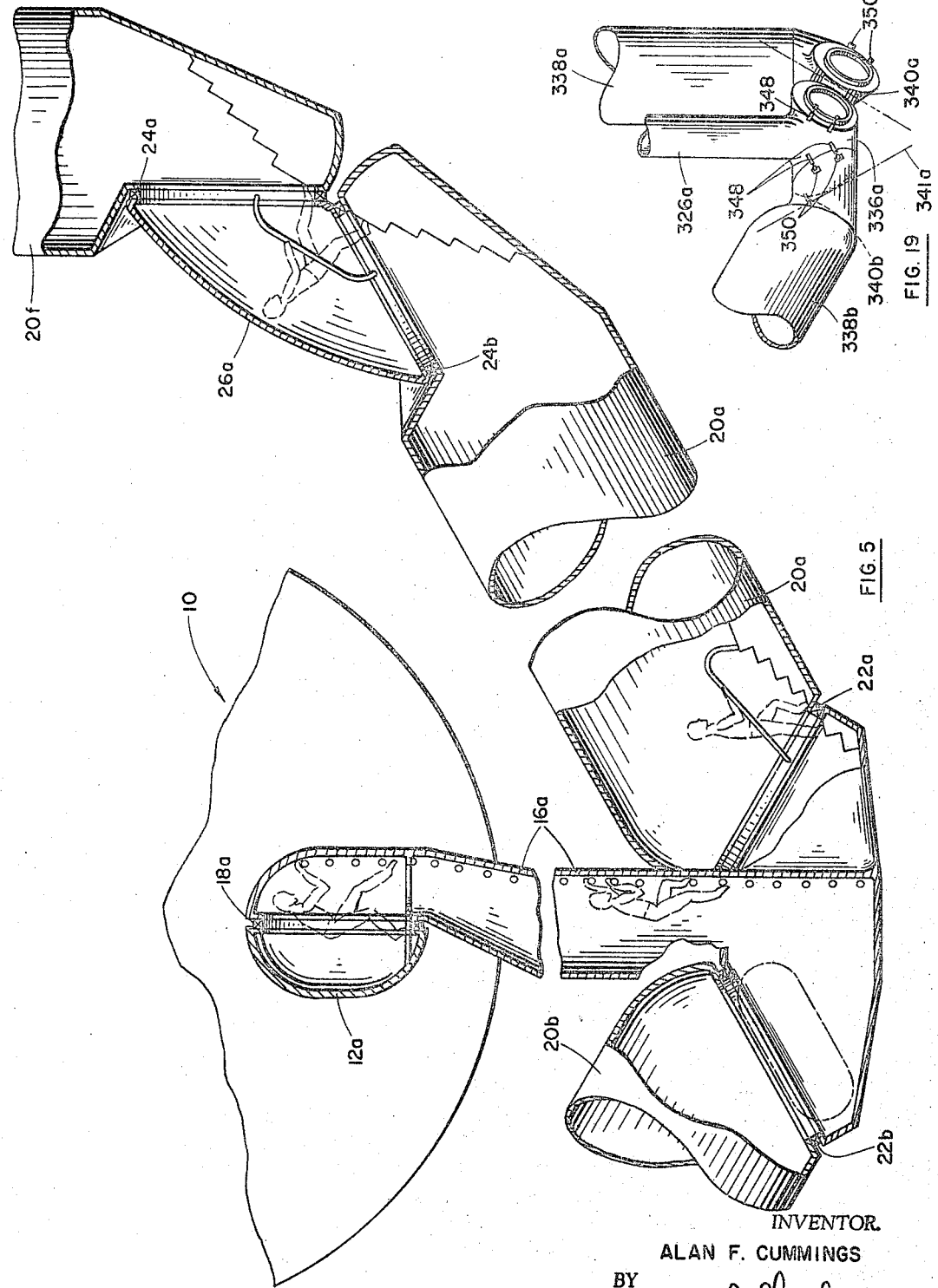

Oct. 24, 1967                A. F. CUMMINGS                3,348,352
                            FOLDABLE STRUCTURE
Filed April 16, 1964                                9 Sheets-Sheet 4

INVENTOR.
ALAN F. CUMMINGS
BY
ATTORNEY

Oct. 24, 1967

A. F. CUMMINGS 3,348,352

FOLDABLE STRUCTURE

Filed April 16, 1964

INVENTOR.
ALAN F. CUMMINGS
BY
*Allen Rothenberg*
ATTORNEY

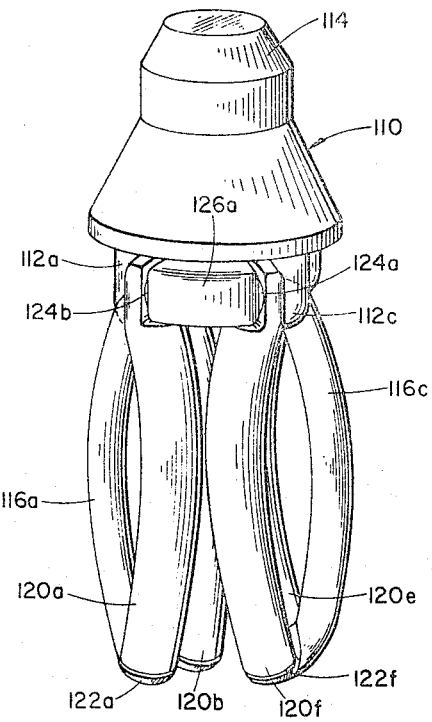
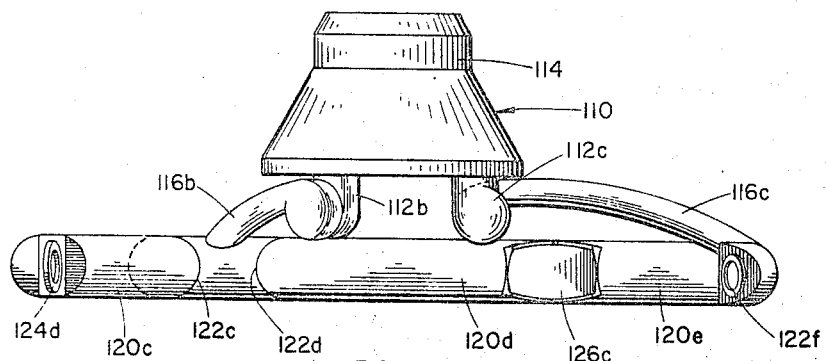
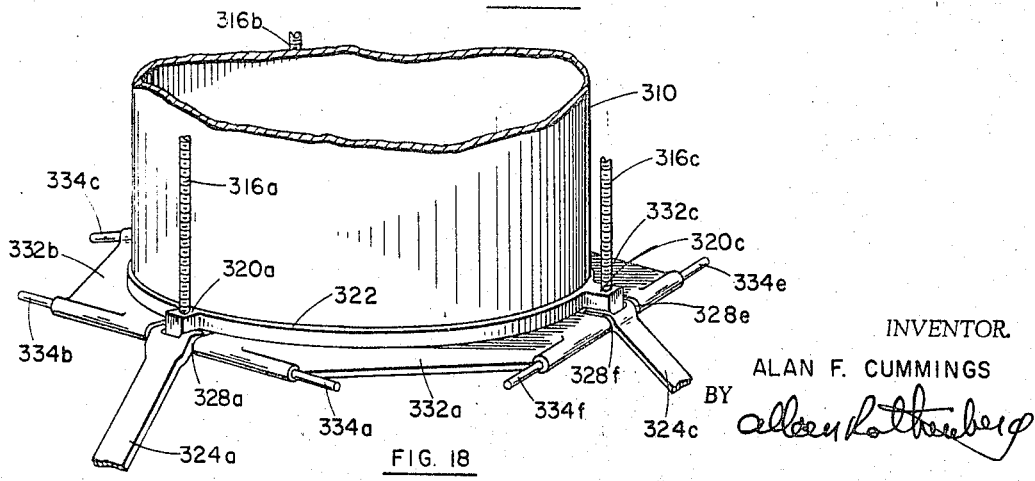

Oct. 24, 1967   A. F. CUMMINGS   3,348,352
FOLDABLE STRUCTURE
Filed April 16, 1964   9 Sheets-Sheet 7
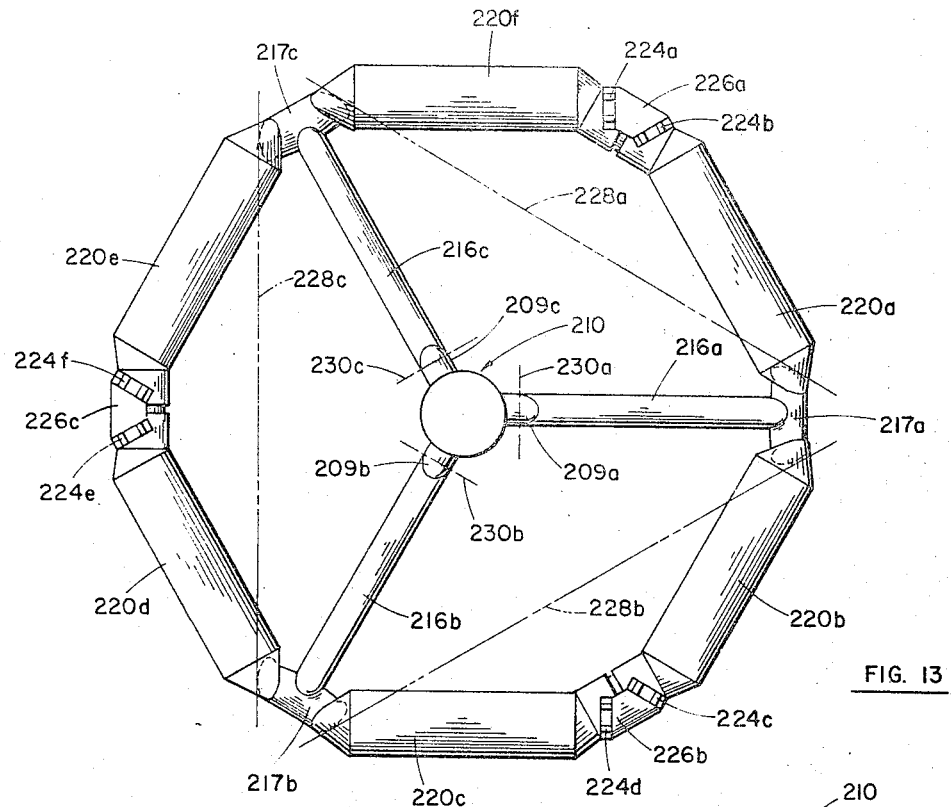
FIG. 13
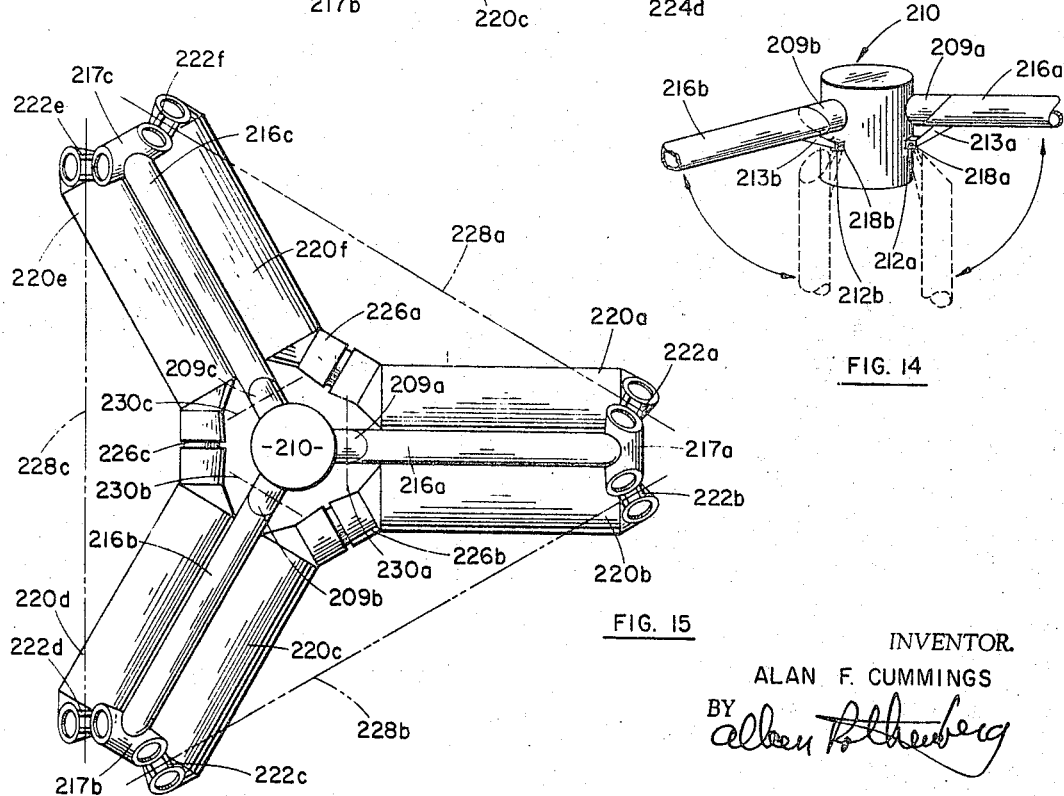
FIG. 14
FIG. 15
INVENTOR.
ALAN F. CUMMINGS
BY
ATTORNEY Oct. 24, 1967     A. F. CUMMINGS     3,348,352
FOLDABLE STRUCTURE
Filed April 16, 1964     9 Sheets-Sheet 9

INVENTOR.
ALAN F. CUMMINGS
BY
ATTORNEY

United States Patent Office 3,348,352
Patented Oct. 24, 1967

3,348,352
FOLDABLE STRUCTURE
Alan F. Cummings, Downey, Calif., assignor to
North American Aviation, Inc.
Filed Apr. 16, 1964, Ser. No. 360,272
14 Claims. (Cl. 52—646)

This invention relates to a foldable structure and more particularly to a foldable wheel-shaped structure of unique articulation that can advantageously be employed as an orbiting space station.

Human factor considerations indicate the need for artificial gravity in a manned orbiting space station, and it has been proposed that this requirement can be met by rotating a space station so that centrifugal force will be imposed on crew-members quartered therein. A large rotating wheel-shaped structure with living quarters in its rim has long been recognized as an ideal concept for this application. Moreover, it is manifest that in order to avoid difficult rendezvous and assembly problems in space, implementation of the wheel concept should be such that launch of the space station can be accomplished in a single package. Because space stations will be of large size, launch of a wheel type station in a single package necessarily requires that the structure be designed so that it can be folded to occupy a minimal space in a launch vehicle and then be deployed to an operational configuration, when placed in orbit, by means of automatic, self-contained mechanisms. Provision for sealing joints of the wheel elements, folded compactness, environmental suitability, and mechanical reliability are primary considerations.

Several concepts for a foldable wheel space station have been previously proposed, including the following: (1) a wheel having components made entirely of a flexible material which can be collapsed for launch and inflated when in orbit; (2) a wheel utilizing rigid hub, spokes and rim elements interconnected by flexible bellows that facilitate folding of the components; and (3) a wheel which is of completely rigid construction yet foldable because its components are interconnected by means of hinged joints. The all rigid concept appears most suitable for a space station because of environmental problems and the lack of structural rigidity and resultant dimensional instability inherent in the inflatable and semi-rigid concepts. However, the all rigid concepts of the prior art are not satisfactory with respect to mechanical simplicity and folded compactness. Disadvantages of the all rigid wheels of the prior art include, for example, an excessive number of articulations and deployment actuations, a lack of uniformity in the type of articulations needed for a single wheel, the necessity for deploying all segments of the wheel simultaneously, and the requirement of close synchronization of motion of all components of the wheel during deployment.

Accordingly, it is a broad object of the invention to provide an all rigid foldable structure the segments of which can be independently deployed. This object, as well as others named hereinafter, is achieved by a structure having: (1) a plurality of spokes ench pivotally connected to a hub for movement between a first folded position wherein the spoke is disposed substantially parallel to the axis of the hub and a second deployed position wherein the spoke is disposed radially of the hub; and (2) a plurality of rim elements which are pivotally connected in pairs to respective ones of said spokes (i.e., each spoke supports ends of two rim elements), the remote (i.e., not connected to a spoke) end of each rim element being interconnected to the remote end of another rim element so that pairs of said elements are connected in end to end relation between the outer ends of said spokes and articulated relative to the spokes and each other so as to be independently deployable.

It is another object of this invention to provide an all rigid foldable wheel-shaped structure which is simple in construction and which can be unfolded with minimal synchronization of the movement of its elements.

It is also an object of the invention to provide an all rigid wheel-shaped structure having spokes and rim elements which can be folded into a compact bundle of annular configuration.

It is another object of the invention to provide an all rigid foldable wheel-shaped structure having a minimum number of articulations.

It is still another object of the invention to provide an all rigid foldable wheel-shaped structure with articulations of a single type.

It is also an object of the invention to provide an all rigid foldable wheel-shaped structure having simple and reliable means for deploying the components thereof from a folded to an operational position.

Other objects and features of this invention will become apparent from the following description when read in conjunction with the accompanying drawings wherein:

FIG. 1 is a pictorial representation of a foldable space station constituting a first embodiment of the invention, the space station being illustrated in a fully deployed configuration;

FIG. 2 is a pictorial representation of the space station of FIG. 1 in a folded configuration wherein all of its spokes and rim elements are disposed parallel to the axis of the hub of the space station;

FIG. 4 is a cross-sectional view of a typical rotary joint employed to interconnect components of the space station of FIG. 1;

FIG. 5 is a cross-sectional view of components of the space station of FIG. 1;

FIG. 11 is an elevational view of the space station of FIG. 9 in a folded configuration;

FIG. 12 is an elevational view of the space station of FIG. 9 in a fully deployed configuration;

FIG. 13 is a plan view of a foldable space station constituting a third embodiment of the invention, the space station being illustrated in a fully deployed configuration;

FIG. 14 is a pictorial representation of several components of the space station of FIG. 13, with portions of the components removed for clarification of the construction of the embodiment;

FIG. 15 is a plan view of the space station of FIG. 13 illustrating its configuration after all of the rim elements thereof have been pivoted 180° from their deployed configuration;

FIG. 18 is a pictorial representation of portions of components of the fourth embodiment of the invention.

FIG. 19 is a pictorial representation of other components of the fourth embodiment of the invention;

Throughout the specification and drawings like reference characters refer to like parts.

Figure 3:
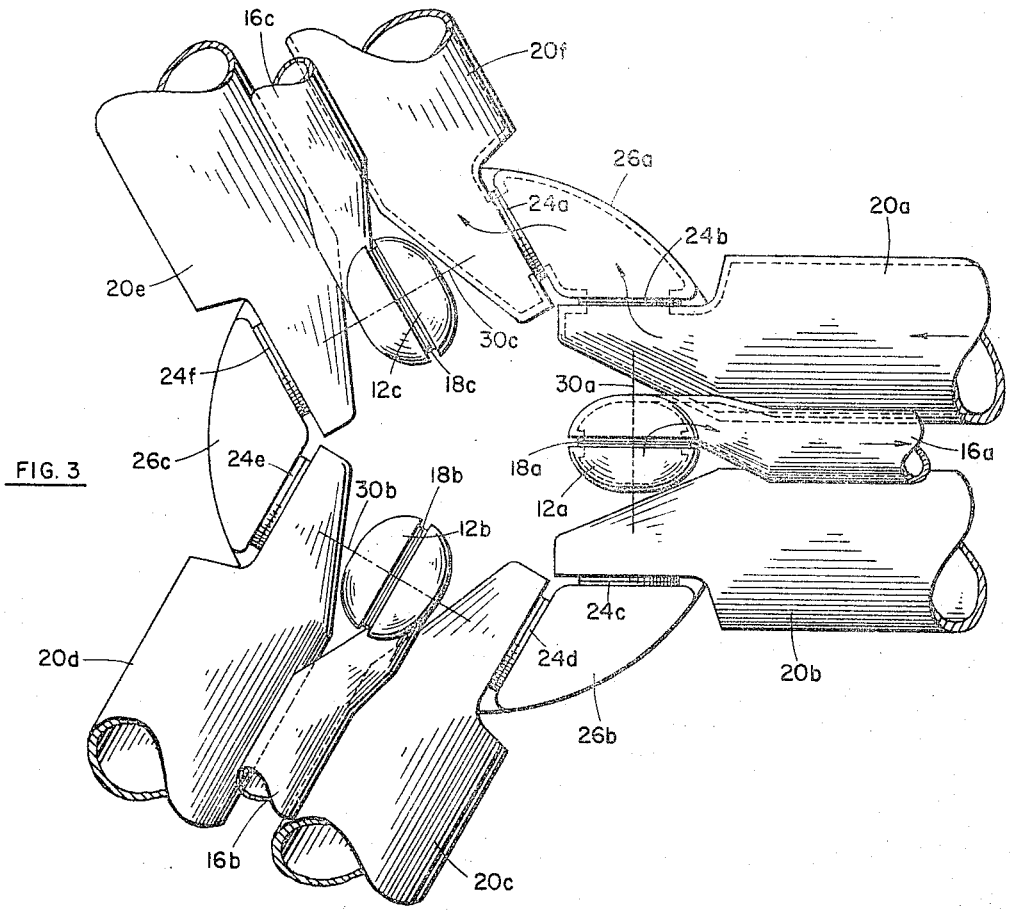
FIG. 3 is a fragmentary view of components of the space station of FIG. 1.

FIG. 1 illustrates a space station constructed in accordance with the principles of the invention so that its components, although completely rigid, can be folded into the compact configuration illustrated in FIG. 2 without simultaneous actuation or motion. The space station comprises a central housing or hub generally designated at 10 from one end of which extend three supports 12a, 12b, 12c (of which only 12a is shown in FIG. 1), the supports having an open interior in communication with the interior of the hub and being positioned near the perimeter of the hub and separated by subtended angles of 120°. The hub comprises a portion 14 that is rotatable with respect to the portion of the hub to which the supports 12 are connected. Transfer of personnel to the space station is facilitated by maintaining the hub portion 14 stationary so that space vehicles can dock at this part of the hub while the other section rotates to provide artificial gravity for personnel in the space station. Three tubular spokes 16a, 16b, 16c are respectively pivotally mounted on the supports so that each spoke can be moved independently between a first folded position wherein the spoke is disposed parallel to the axis of the hub, as illustrated in FIG. 2, and a second deployed position wherein the spoke is disposed radially of the hub, as illustrated in FIG. 1. Recesses 17a, 17b and 17c, two of which can be seen in FIG. 1, are formed in the edge of the hub 14 to provide clearance for the spokes in the deployed position. As illustrated in FIG. 3, connection between the spokes and supports is effected by means of respective rotary type joints, 18a, 18b, 18c which provide hermetic seals at the junction of the spokes and supports while permitting unrestricted access between these components through the open central area thereof (indicated in the figure by the area within broken lines).

FIG. 4 illustrates one design of a sealed rotary type joint that may be used for joints 18a, 18b, 18c, a typical rotary joint comprising two mating members 20, 22 which are integral with, and extend circumferentially about, the perimeters of a support 12 and spoke 16 respectively. An annular member 24, provided with a plurality of rotatable bearing wheels 26 in contact with one side of a circumferential groove 27 formed in member 20, is fixedly secured by a plurality of bolts 28 to member 22 so as to lock the two members together while permitting rotary motion of one with respect to the other, such motion being facilitated by a plurality of ball bearings 30 positioned in two raceways in member 20 and in contact with inner surfaces of member 22. The rotary joint is sealed by two O-rings 32 and 34 interposed between adjacent surfaces of the members 20 and 22, and by a third seal 36 which extends circumferentially about, and is fixed to, member 22 by means of a spring member 38, the spring member being itself secured to flange 22 by a plurality of bolts 40 and formed so as to hold the seal 36 against the end surface of member 20 under pressure. Rotary motion of the spoke 16 with respect to support 12 is effected by means of an electric motor 42, fixedly positioned on the inner surface of member 22, which drives a pinion gear 44 that is engaged with a ring gear 46 integrally formed on the inner surface of member 20. It is to be understood the above-described concentric ring bearing assembly is exemplary only, the invention not being limited to a particular rotary joint design for interconnection of the components of its embodiments.

Again in reference to FIG. 1, each of the spokes is formed with an enlarged end portion 19a, 19b, 19c to which two tubular rim elements, individually identified as 20a through 20f, are respectively connected by means of sealed rotary joints, individually identified as 22a through 22f, of the type described above, thus permitting movement of personnel inside the space station from a spoke to either of the two rim elements connected thereto. Rotary motion between the rim elements and the spokes at the joints 20a through 20f is effected by means of ring and pinion gear drives of the same type illustrated in FIG. 4 and described above. Sealed rotary joints of the same design, identified as 24a through 24f, are also employed to pivot pairs of the rim elements (for example, 20b and 20c) to a respective one of three hollow interconnecting members 26a, 26b, 26c, thus also permitting access between the rim elements through the respective interconnecting member to which they are pivoted. There is no need for driving means at the joints between the rim elements and respective interconnecting members to which they are connected, the aforementioned drive means between the other joints of the space station being capable of imparting the necessary rotary motion between these components to cause their deployment from the configuration illustrated in FIG. 2 to the configuration illustrated in FIG. 1, as will be hereinafter described. As illustrated in FIG. 5, which is a cross-sectional view of portions of typical components of the space station, space vehicles can be docked at the hub 10 and their crew-members can enter the hub and pass through a support 12 and spoke 16 to reach living and working quarters located in the rim elements 20 of the space station.

Figure 7:
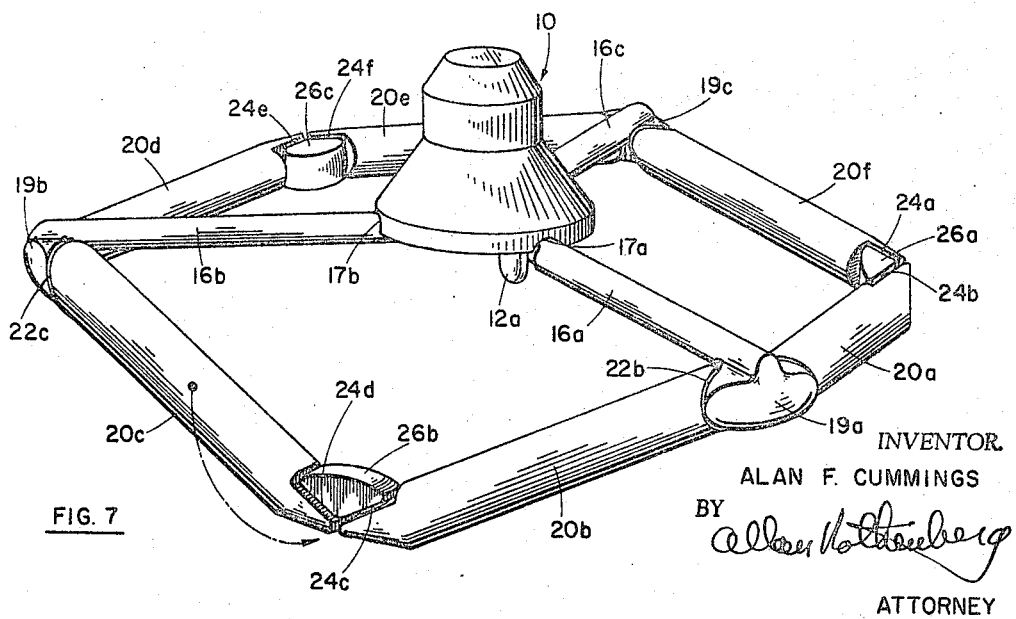
FIG. 7 is a pictorial representation of the space station of FIG. 1 illustrating its configuration after two rim elements thereof have been pivoted 90° from their deployed position.
Figure 6:
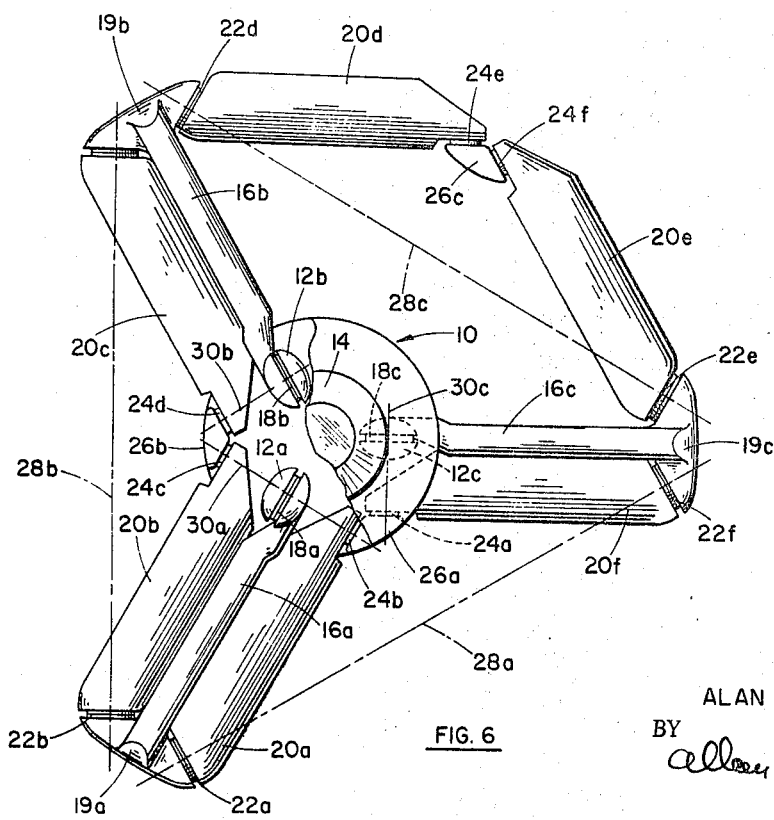
FIG. 6 is a plan view of the space station of FIG. 1 illustrating its configuration after four of the rim elements thereof have been pivoted 180° from their deployed position.

The joints 22a through 22f are aligned with respect to the spokes so that when the spokes are in a deployed configuration wherein they extend radially of the hub 10, the axes of rotation of pairs of the joints are coincident, i.e., line 28a of FIG. 1 is coincident with the axes of rotation of joints 22a and 22f, line 28b is coincident with the axes of rotation of joints 22b and 22c, and line 28c is coincident with the axes of rotation of joints 22d and 22e. As can be seen in FIG. 6, the longitudinal axis of a respective rim element 20a through 20f is disposed at an angle to the axis of rotation of the respective joint 22a through 22f connecting the rim element to a respective spoke. Consequently, pairs of interconnected rim elements (namely, 20b and 20c, 20d and 20e, and 20f and 20a) can independently or simultaneously be pivoted from a position wherein the rim elements extend circumferentially around the spokes, as illustrated in FIG. 1, to a position wherein the rim elements lie adjacent to the spokes, as illustrated in FIG. 6 in the case of the two pairs of rim elements 20b and 20c, and 20a and 20f. Obviously, in deployment the reverse of the folding motions occurs. This actuation is effected by means of the ring and pinion gear drives that are located at the respective joints 22a through 22f. For clarification of the manner in which the rim elements are actuated, FIG. 7 illustrates a pivoted position of the two rim elements 20b and 20c that is intermediate the configurations of the same components in FIGS. 1 and 6, namely, a position wherein the rim elements have been simultaneously rotated 90° about joints 22b and 22c respectively in the direction indicated by the arrow, at which point a plane including the longitudinal axes of the two rim elements is normal to a plane including the longitudinal axes of the spokes. Continued rotation of this pair of rim elements about their respective joints 22b and 22c will move the elements into juxtaposition with spokes 16a and 16b respectively. The other two pairs of rim elements, namely, 20d, 20e and 20a, 20f, can likewise be rotated about their respective joints 22d, 22e and 22a, 22f to a position adjacent the spokes to which they are connected. During this folding step there is no necessity for pivotal motion of rim elements with respect to the respective interconnecting members 20a, 20b, 20c, the described movement being effectible even if the ends of the rim elements remote from the spokes were joined in such a manner that no motion of one with respect to the other could occur. However, in the next described folding step, rotation of the rim elements about the respective joints 24a through 24f is required.

Figure 8:
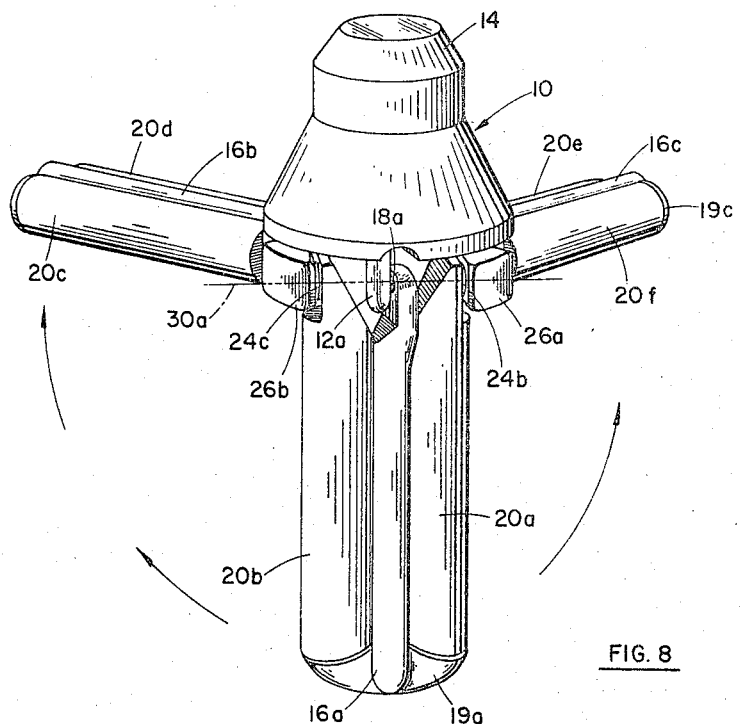
FIG. 8 is a pictorial representation of the wheel of FIG. 1 in a partially deployed configuration wherein two spokes and rim elements connected thereto extend radially of the hub and one spoke and rim elements connected thereto extend parallel to the axis of the hub.

FIG. 8 illustrates the configuration of the space station after each of the rim elements has been rotated, in pairs as described above in connection with rim elements 20b and 20c, to a position wherein the rim elements lie adjacent the spokes, and after two rim elements, namely 20a and 20b, and the spoke 16a to which they are connected, have undergone a final folding step in which the two rim elements and the spoke are simultaneously pivoted about joints 24b, 24c and 18a respectively to a position wherein these components are disposed substantially parallel to the axis of the hub 10. Pivotal movement of the rim elements 20a and 20b and spoke 16a as a unit can be carried out because when the rim elements are folded adjacent the spoke, the axes of rotation of joints 24b, 24c and 18a are coincident, i.e., line 30a of FIGS. 6 and 8 is coincident with the axes of rotation of these three joints. This folding step is actuated by the above-described ring and pinion gear drive located at the joint 18a which operates to pivot the spoke about the support 12a. This pivotal movement of spoke 16a causes the two rim elements 20a and 20b connected thereto to pivot simultaneously about the respective joints 24b and 24c interconnecting these rim elements to the interconnecting members 26a and 26b respectively. As the other interconnecting member, spokes and rim elements are articulated in the same manner as spoke 16a, rim elements 20a, 20b, and interconnecting members 26a, 26b, all groups of the components can be folded, either simultaneously or independently, from the position wherein a group of rim elements and spokes extend radially of the hub 10 to the position wherein the rim elements and spokes of a group lie substantially parallel to the axis of the hub as illustrated in FIG. 2. The space station is of course launched in this last-described configuration and when it has been established in orbit the spokes and rim elements are deployed to the configuration illustrated in FIG. 1 in unfolding steps reversed in motion and order from the described folding steps. Under the weightless condition that exists when the space station is in orbit, the small amount of power required to rotate the spokes about the hub-mounted supports to which they are mounted and the rim elements about the spokes and interconnecting members will be only that required to overcome friction of the rotary joints.

An important advantage in using rotary joints of the above-described type in the articulation of the space station is that even when the components of the space station are in configuration illustrated in FIG. 2 (i.e., the launch configuration) the interior of the structure is sealed and therefore capable of providing a protective environment for crew members therein. Furthermore, all portions of the space station are freely accessible when the space station is folded because the central area of each rotary joint is open in any pivoted position of the components connected thereby. These advantages of a sealed interior and accessibility between components of the structure are maintained throughout the unfolding of the space station after it has been placed in orbit about the earth.

Figure 9:
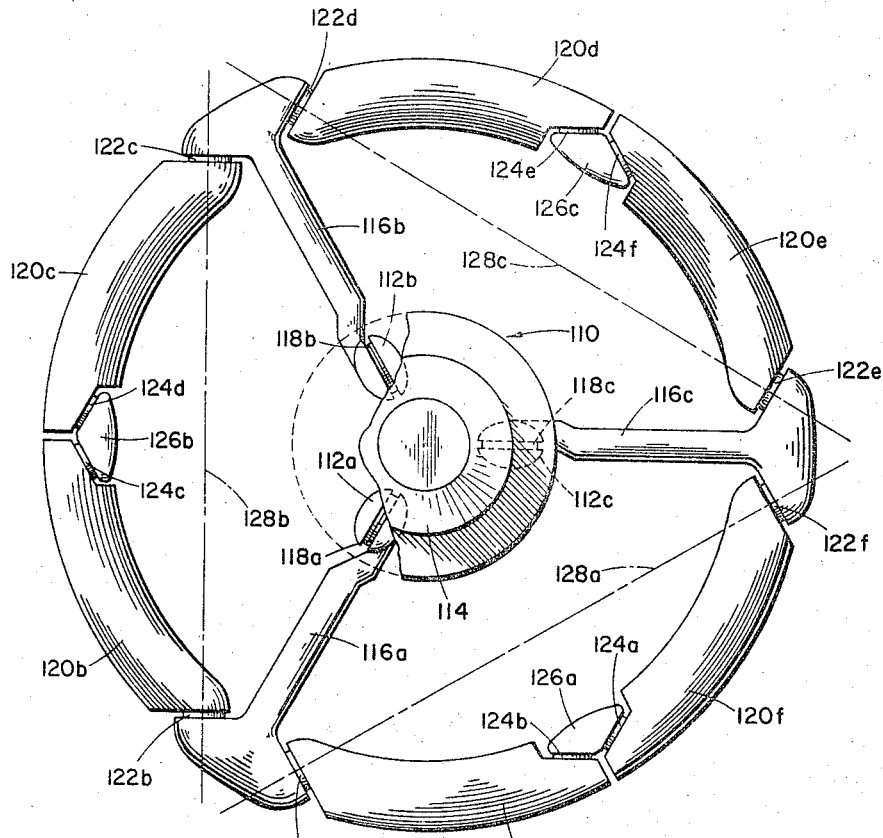
FIG. 9 is a plan view of a foldable space station constituting a second embodiment of the invention, the space station being illustrated in a fully deployed configuration.
Figure 10:
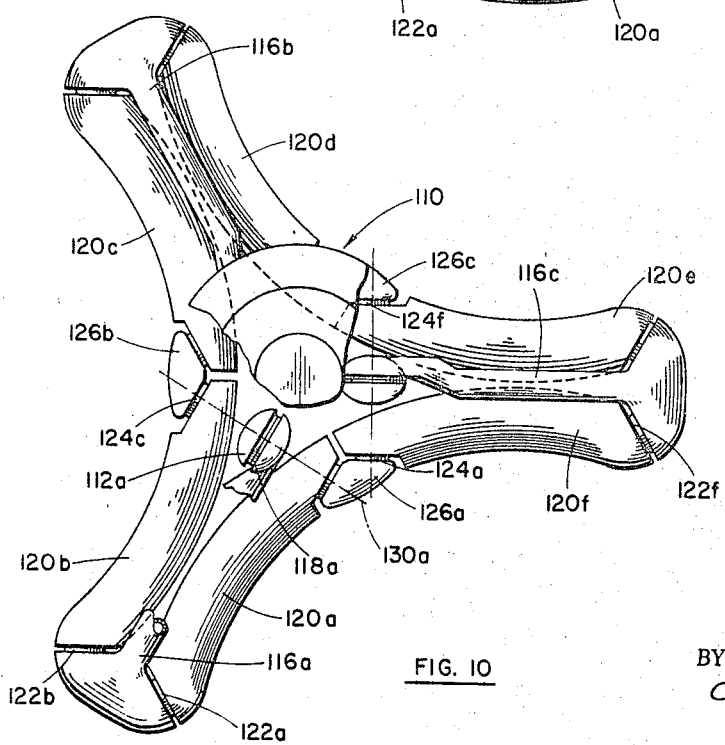
FIG. 10 is a plan view of the space station of FIG. 9 illustrating its configuration after all of rim elements thereof have been pivoted 180° from their deployed configuration, with portions of one spoke and the hub removed for clarification of the arrangement of the components.

FIGS. 9, 10, 11 and 12 illustrate a second embodiment of the invention which is identical to the first described space station except that its spokes and rim elements are curved rather than straight. The second embodiment comprises a hub 110; supports 112a, 112b, 112c integral with said hub; spokes 116a, 116b, 116c; rim elements 120a through 120f; and interconnecting members 126a, 126b, 126c. These components are interconnected by respective sealed rotary joints 118a, 118b, 118c which pivotally interconnect the spokes to the hub, joints 122a through 122f which pivotally interconnect the rim elements to the spokes, and joints 124a through 124f which pivotally interconnect the rim elements to the interconnecting members. Each of these joints may be of the same construction as the joint illustrated in FIG. 4 and described above. The rim elements of the second embodiment are formed with a uniform curvature so that when the space station is deployed as illustrated in FIG. 9 the rim of the space station is rotiform rather than hexagonal in shape as is the case of the first described embodiment of the invention. This geometric configuration facilitates placing the floor of the living quarters in each rim element so that all points thereon are equidistant from the axis of rotation of the space station (i.e., the axis of the hub 110), and consequently crew-members standing on the floor at any point within a rim element will be subjected to the same centrifugal force.

The geometric relation of the components of the second embodiment of the invention is the same as that of the first embodiment in the corresponding configuration. When the rim elements 120a through 120f are deployed as illustrated in FIG. 9, the axes of rotation of pairs of the joints 122a through 122f are coincident, as indicated in the drawing by lines 128a, 128b, 128c. Rotation of the rim elements 180° brings them into the configuration illustrated in FIG. 10 wherein the axis of rotation of each spoke 116a, 116b, 116c about its respective support 112a, 112b, 112c is coincident with the axes of rotation of the respective two adjacent rim elements (namely, the pairs 120a and 120b, 120c and 120d, and 120e and 120f) about respective interconnecting members 126a, 126b, 126c, this coincidence of rotational axes being indicated, as a typical example, by line 130a of the drawing. The spokes 116a, 116b, 116c and rim elements 120a through 120f can therefore be pivoted about the supports 112a, 112b, 112c and interconnecting members 124a, 124b, 124c to which they are respectively connected, either simultaneously or in units of one spoke and the two rim elements connected thereto, to a position wherein the rim elements and spokes are disposed substantially parallel to the axis of the hub 110, as illustrated in FIG. 11. It will be seen in FIG. 10 (in which portions of hub 110 and spoke 116a have been removed for clarity) that in the intermediate folded configuration of the second embodiment of the invention the two rim elements connected to each spoke are almost in contact with each other. Consequently, the spokes cannot be disposed between the rim elements as they are in the corresponding configuration of the first described embodiment and, as illustrated in FIG. 12, must be formed with a curvature so that they do not interfere with the rim elements when the latter are rotated 180° from their deployed position illustrated in FIG. 9.

FIGS. 13, 14 and 15 illustrate a third embodiment of the invention which has the same basic geometric arrangement as the embodiment illustrated in FIG. 1 but which differs therefrom in having its components pivotally interconnected by means of linearly articulated hinge joints rather than by the rotary type of joint employed in the first and second described embodiments of the invention. As illustrated in FIG. 13, three tubular members 209a, 209b, 209c extend radially from the wall of the hub 210 of the space station, the subtended angles between the axes of these members being 120° and the interiors of the members being in communication with the interior of the hub. In FIG. 14 can be seen two of three supports 212a, 212b, 212c, each of which is fixedly mounted on the hub 210 adjacent a respective one of the members 209a, 209b, 209c. Also shown in the same drawing are two of three arms 213a, 213b, 213c, each of which is pivotally mounted at one end to a respective one of said supports 212a, 212b, 212c by means of a respective pin 218a, 218b, 218c (only two of which can be seen in the drawing) and which at the other end is fixedly attached to one of three spokes 216a, 216b, 216c (only two of which can be seen in the drawing). The spokes can be pivoted about their respective supports from the position illustrated in FIGS. 13, 14 and 15, wherein the ends of the spokes are in mating engagement with the ends of respective members 209a, 209b, 209c, to a position, indicated by phantom lines in FIG. 14, wherein the spokes extend substantially parallel to the axis of the hub 210. In FIGS. 13 and 15 the axes of the pins (or hinge joints) respectively connecting the spokes to the supports 212a, 212b, 212c are identified by lines 230a, 230b, 230c.

It can be seen in FIG. 15 that a respective tubular member 217a, 217b, 217c is mounted at the outer end of each of the spokes at a right angle thereto, the interior of each of these members being in communication with the interior of the connected spoke. Respective pairs of a plurality of rim elements 220a through 220f are pivotally connected to the members 217a, 217b, 217c by means of respective linearly articulated hinge joints 222a through 222f which may comprise the same pin type connection employed to pivot the spokes to the hub supports 212a, 212b, 212c. As illustrated in FIG. 13 the rim elements are also pivotally connected in pairs to respective interconnecting members 226a, 226b, 226c by means of hinge joints 224a through 224f of the same linearly articulated pin type design. In both FIG. 13 and FIG. 15, lines 228a, 228b, 228c illustrate the coincidence of the axes of pairs of hinge joints 222a through 222f when the spokes are radially extended from the hub 210, this arrangement permitting pairs of the rim elements to be simultaneously pivoted about respective joints 222a through 222f between a position wherein the rim elements extend circumferentially around the spokes, as illustrated ni FIG. 13, and a position wherein the rim elements lie adjacent the spokes, as illustrated in FIG. 15. When the rim elements are folded adjacent the spokes, the axes of pairs of hinge joints 224a through 224f are coincident with the axis of a respective one of the hinge joints 218a, 218b, 218c interconnecting the arms 213a, 213b, 213c (and thus the spokes) to the hub of the space station, this coincidence being indicated in FIG. 15 by lines 230a, 230b, 230c. The spokes and rim elements can thus be pivoted about their respective joints 218a, 218b, 218c and 224a through 224f, either simultaneously or in groups of one spoke and the two rim elements connected thereto, to a position wherein these components are disposed substantially parallel to the axis of the hub 210. The spokes and rim elements will of course be disposed in the last described configuration when the space station is launched and will subsequently be deployed in unfolding steps reversed in motion and order from the described folding steps. Conventional means (not shown), such as gear drives or cable and pulley actuation systems, can be employed to pivot the spokes and rim elements about their respective interconnecting hinge joints to the deployed configuration wherein mating ends of the components are in abutting relation. The interior of the space station can then be sealed by means of conventional clamps (not shown) adapted to lock the components together under pressure at the mating joints thereof.

Figure 16:
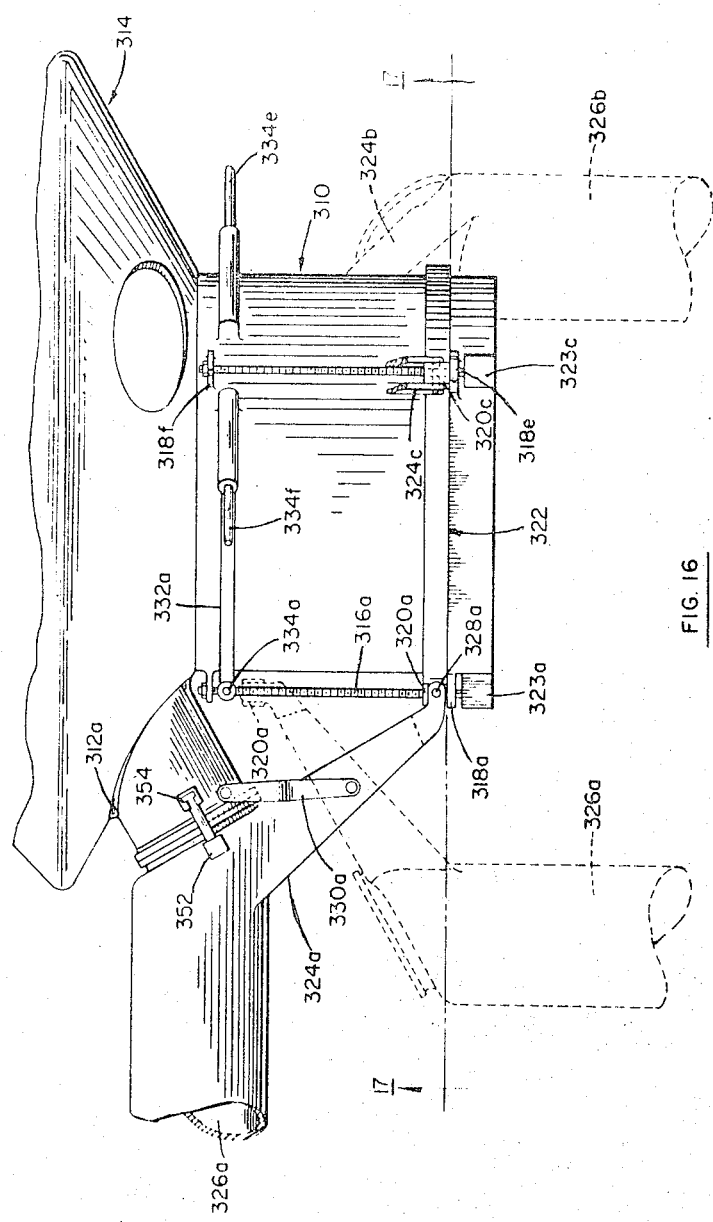
FIG. 16 is a fragmentary elevational view of components of a space station constituting a fourth embodiment of the invention.
Figure 17:
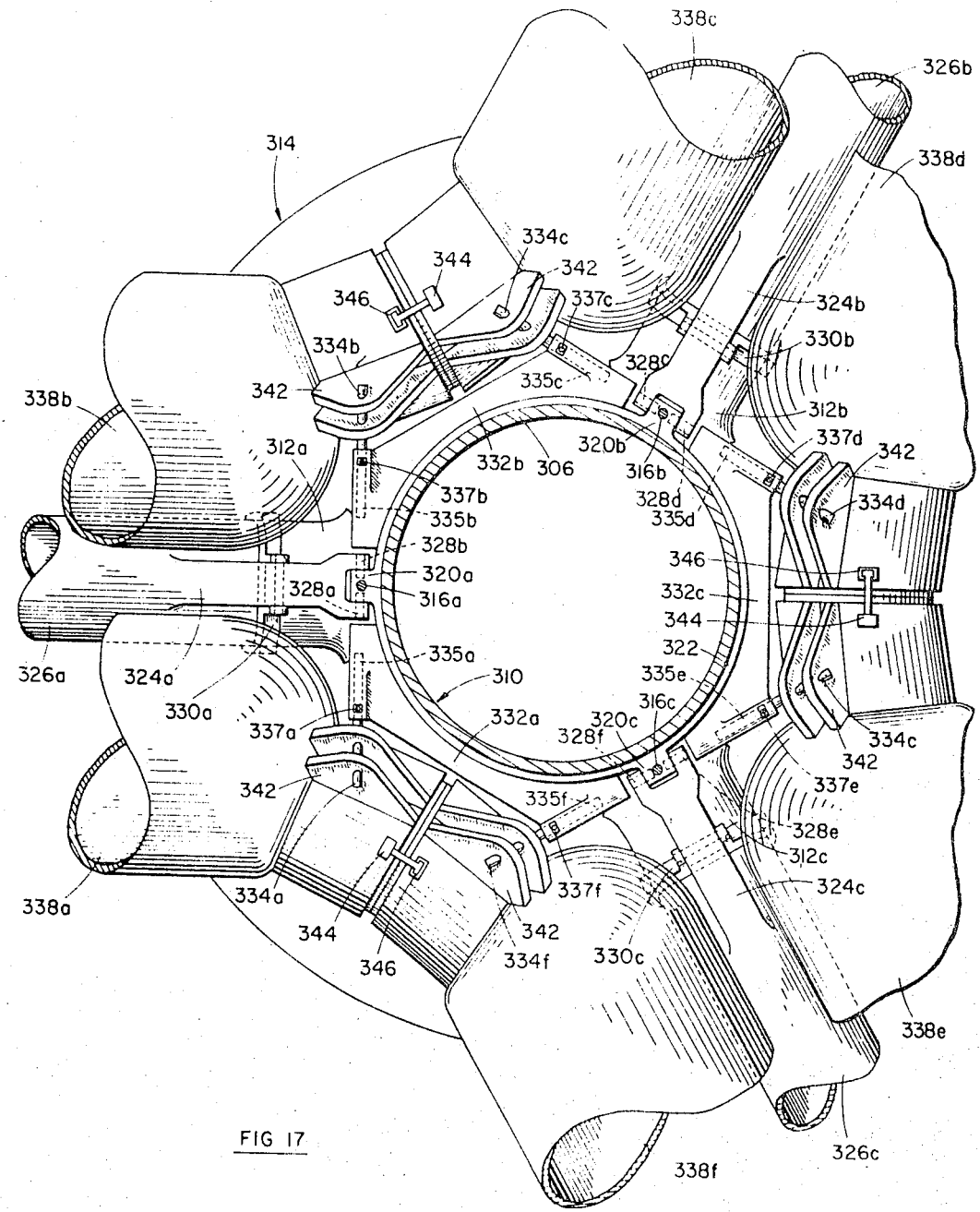
FIG. 17 is a sectional view of components of the fourth embodiment of the invention taken along line 17—17 of FIG. 16.

A fourth embodiment of the invention is illustrated in FIGS. 16, 17, 18 and 19, this embodiment being similar to the space station illustrated in FIG. 13 but having no interconnecting members between its adjacent rim elements and also differing from the structure of the previously described space stations with respect to the manner in which the spokes are pivotally interconnected to the central housing of the space station. In reference to FIG. 16, the fourth embodiment includes a central housing, generally designated at 310, having three tubular members 312a, 312b, 312c (only one of which is shown in the drawing) extending from an enlarged portion 314 thereof, the subtended angles between the axes of these tubular members being 120° and the interior of the members being in communication with the interior of the housing. The ends of each of three lead screws 316a, 316b, 316c (only two of which are shown in the drawing) are respectively rotatably mounted to the housing 310 by means of pairs of the support members 318a through 318f (only four of which can be seen in the drawing) so that the lead screws are positioned parallel to the longitudinal axis thereof and respectively adjacent the tubular members 312a, 312b, 312c. The lead screws respectively pass through threaded holes in three bosses 320a, 320b, 320c (only two of which are shown in the drawing) integrally formed on a circinate member, generally designated at 322, which is slidably positioned around the housing 310 so as to be movably axially thereof when the lead screws are rotated by a respective one of three drive motors 323a, 323b, 323c (only two of which are shown). As illustrated in FIG. 17, three arms 324a, 324b, 324c are respectively fixedly attached at one end to spokes 326a, 326b, 326c and at the other end are pivotally connected by means of pins 328a through 328f to the bosses 320a, 320b, 320c on the member 322. The prong ends of bifurcated links 330a, 330b, 330c are respectively pivotally connected to the tubular members 312a, 312b, 312c and the other end of each of these links is pivotally connected to a respective one of the arms 324a, 324b, 324c at a point intermediate the ends thereof. It can be seen in FIG. 17 that the member 322 is formed with three integral flanges 332a, 332b, 332c each of which supports respective pairs of pivot pins individually identified by reference characters 334a through 334f. The axes of pairs of these pins are coincident with the axis of respective pins connecting the arms 324a, 324b, 324c to the bosses 320a, 320b, 320c formed on member 322, for example, the axis of pins 328a and 328b are coincident with the axis of pins 334a and 334b. For a purpose that will be explained hereinafter, each of the pivot pins 334 is mounted in its supporting flange so as to be retractable within the flange, this arrangement being readily accomplished by mounting the pins 334 in holes 335a through 335f that are formed in the respective flanges 332a, 332b, 332c so as to extend beyond the inner ends of said pins, and by providing shear pins 337a through 337f which hold the pins 334 in an extended position but which can be easily broken to permit the pivot pins 334a through 334f to be forced back into their mounting holes. For clarification of the arrangement of these components, portions of the member 322, a typical lead screw, and a typical spoke are also illustrated pictorially in FIG. 18.

FIG. 19 illustrates the outer end of spoke 326a, the construction and arrangement of which is typical of the other two spokes 326b, 326c and which is also identical to the design of the spokes in the embodiment of the invention illustrated in FIG. 15. A tubular member 336a is integral with the outer end of the spoke and tangentially disposed to the axis thereof, the interior of this member being in communication with the interior of the spoke. Rim elements 338a, 338b are pivotally connected to respective ends of the tubular member 336a by means of respective pin type hinges 340a, 340b, the axes of which are aligned in the same manner as the axes of the corresponding hinges of the embodiment of the invention illustrated in FIG. 15. For example, when the spokes are in a deployed configuration (i.e., radial to the housing 310) the axis of hinge 340b (indicated in the drawing by line 341a) is coincident with the axis of the hinge (not shown) connecting rim element 338c (shown in FIG. 17) to the spoke 326b.

As can be seen in FIG. 17 in the case of rim elements 338b, 338c, a pair of lugs 342 is fixedly attached to each of the rim elements at the end thereof which is not connected to a spoke, each of these lugs having a hole formed therein that is aligned with a respective one of the pivot pins 334a through 334f when the rim element to which the respective lug is attached is folded adjacent a spoke. A plurality of conventional clamps 344 are pivotally mounted on the periphery of alternate ones of the rim elements at the same end where the lugs 342 are mounted, these clamps being engageable with cooperating lugs 346 fixedly attached to the periphery of an adjacent rim element so that the two rim elements can be securely locked together at an appropriate time during the deployment of the space station, as will be noted hereinafter. As illustrated in FIG. 19, clamps 348 and cooperating lugs 350, identical in construction to the clamps 344 and lugs 346 respectively are respectively mounted on the tubular members 336a through 336f and the other ends of the rim elements so that the joints between these components can be sealed after the space station has been fully deployed. Likewise, the joints between the spokes and respective tubular members 312a, 312b, 312c can be sealed by means of clamps 352 and cooperating lugs 354 attached to these components respectively, as illustrated in FIG. 16.

When the above-described space station is launched all of its rim elements are pivotally connected to the member 322 by means of the lugs 342 respectively mounted on the pivot pins 334a through 334f, with the rim elements being pivoted about these pivot pins to a position wherein they lie parallel to the longitudinal axis of the housing 310. After the space station has been established in orbit the spokes can be simultaneously deployed to a radially extending position by rotating the lead screws 316a, 316b, 316c to move the member 322 and spokes 326a, 326b, 326c from the position shown in phantom lines in FIG. 16 to the position shown in solid lines, during which movement the links 330a, 330b, 330c cause the arms 324a, 324b, 324c to pivot about the bosses 320a, 320b, 320c that are integral with the member 322 thus bringing the spokes into a position radial to the housing 310 and in abutting relation with respective tubular members 312a, 312b, 312c, at which point these components can be locked together by means of clamps 352 and lugs 354. During deployment the arms connected to the spokes also pivot about their connection with links 330a through 330c which in turn swing about the connections of their bifurcated ends to the tubular elements 312a, 312b, and 312c. As the spokes are deployed the rim elements simultaneously pivot about the pivot pins 334a through 344f to a position wherein they extend radially from the housing 310 as illustrated in FIG. 17 by the position of rim elements 338b and 338c. Each of the pivot pins 334a through 334f is then retracted into a respective hole 335a through 335f in the respective flanges 332a, 332b, 332c in which the pin is mounted, freeing lugs 342 from member 322, and the ends of adjacent rim elements are clamped together by means of clamps 344 and their cooperating lugs 346. The rim elements can thereafter be pivoted in pairs about their respective hinges 340a through 340f to a position wherein they extend circumferentially around the ends of the spokes as indicated in FIG. 19 by the position of the rim elements 338b. The joints between the rim elements and spokes are then sealed by means of clamps 348 and lugs 350 after which environmental gases can be introduced into the interior of the space station from storage tanks to provide "shirtsleeve" living conditions for its crew-members.

The major components of the above-described embodiments of the invention, such as the central housing, spokes and rim elements, are constructed of materials having a high strength to weight ratio, as for example aluminum alloys. The size of space stations conforming to the principles of the invention is limited only by the capacity of boosters used to establish them in orbit, which, for the present, indicates that the space stations can have overall diameters of at least 150 feet, in which case the rim elements in which living and working quarters are located can have a diameter of approximately ten feet.

One of the utile features resulting from the manner of articulation of the described embodiments of the invention is that in their folded configuration the spokes and rim elements of each of the space stations are disposed parallel to the axis of the central housing, or hub, in an annular bundle. It will be appreciated that the open space between the folded spokes and rim elements can advantageously be utilized for storage of auxiliary equipment or space vehicles during the launch of the space station and its projection into orbit. Furthermore, the articulation of each of the described space stations is accomplished by means of a single type of joint between the components thereof, which results in considerable simplification over the construction and actuation of the space stations known in prior art. Unlike the compoennts of most of the known space stations, the components of space stations constructed in accordance with the principles of the invention can be deployed without requiring simultaneous actuation. (Independent actuation is to a certain extent limited in the case of the fourth embodiment pictured in FIGS. 16 and 17, all of the spokes of which must simultaneously be deployed before the rim elements can be deployed in pairs to the fully deployed configuration of the space station, but even this embodiment requires a lesser degree of synchronization of deployment movements than is required for most space stations of the prior art.) It is thus seen that the invention provides a highly significant advance in the design of structures for use by man in space.

What is claimed is:
1. A structure comprising:
    a hub,
    a plurality of rigid inextensible spokes,
    first joint means pivotally connecting one end of each of said spokes to said hub for movement between a first folded position wherein said spokes are disposed substantially parallel to one another and a second deployed position wherein said spokes extend radially of said hub,
    a plurality of rigid rim elements each having an end adjoining an end of an adjacent rim element to provide a series of element junctions,
    a plurality of second joint means pivotally connecting the other end of respective spokes to adjoining ends of adjacent rim elements at respectively different ones of alternate junctions, each of said second joint means comprising a connecting portion rigidly connected to each of said spokes and a separate joint means between said connecting portion and each of the adjacent rim elements, pairs of said second joint means at mutually remote ends of a pair of adjacent rim elements having axes substantially coincident when said spokes are in said deployed position, thereby permiting movement of a pair of said rim elements between adjacent spokes between a first folded position wherein said rim elements are disposed substantially parallel to and juxtaposed with the spoke connected thereto when said spokes are in said deployed position, and a second deployed position wherein said rim elements extend laterally from said spokes, independent of folding of others of said rim elements,
    third joint means pivotally interconnecting adjoining rim element ends which are remote from said spokes in the deployed position of said rim elements, pairs of said third joint means at mutually remote ends of a pair of adjacent rim elements having axes substantially coincident with an axis of one of said first joint means when said rim elements are in their folded position, thereby permitting folding of one spoke in unison with the juxtaposed rim elements pivotally connected thereto independent of folding of others of said spokes, and
    means for limiting pivotal motion of said spokes and said rim elements about said joint means to the coincident axes.

2. The structure of claim 1 in which each of said first, second and third joint means comprises concentric ring bearing assemblies in face to face juxtaposition.

3. The structure of claim 1 in which each of said first, second and third joint means is linearly articulated.

4. The structure of claim 1 wherein each of said spokes and rim elements is of substantially linear extent and each of said rim elements is angulated relative to the adjacent rim elements in the second deployed position wherein said rim elements extend laterally from said spokes.

5. The structure of claim 1 wherein each of the spokes is bowed away from the plane of the rim elements in deployed position and the rim elements are curved to form a circular rim assembly in deployed position.

6. The structure of claim 1 wherein each of said spokes and each of said rim elements has substantially the same length between the coincident axes.

7. A structure comprising:
a hub;
a plurality of rigid hollow tubular spokes;
first joint means pivotally connecting one end of each of said spokes to said hub for movement between a first folded position wherein said spokes are disposed substantially parallel to one another and a second deployed position wherein said spokes extend radially of said hub;
a plurality of rigid hollow tubular rim elements each having an end adjoining an end of an adjacent rim element to provide a series of element junctions;
a plurality of second joint means pivotally connecting the other end of respective spokes to adjoining ends of adjacent rim elements at respectively different ones of alternate junctions, pairs of said second joint means having axes substantially coincident when said spokes are in said deployed position, thereby permitting movement of a pair of said rim elements between adjacent spokes between a first folded position wherein said rim elements are disposed substantially parallel to and juxtaposed with the spoke connected thereto when said spokes are in said deployed position, and a second deployed position wherein said rim elements extend laterally from said spokes, independent of folding of others of said rim elements;
third joint means pivotally interconnecting adjoining rim element ends which are remote from said spokes in the deployed position of said rim elements, pairs of said third joint means having axes substantially coincident with an axis of one of said first joint means when said rim elements are in their folded position, thereby permitting folding of one spoke in unison with the juxtaposed rim elements pivotally connected thereto independent of folding of others of said spokes;
means for limiting pivotal motion of said spokes and said rim elements about said joint means to the coincident axes; and
sealing means positioned in said joint means whereby the interior of said spokes and rim elements may remain sealed during motion between the several positions thereof.

8. A structure comprising:
a hub,
a plurality of spokes circumferentially spaced about the hub,
first joint means for pivotally connecting each of the spokes to the hub for movement of the spoke about only a single axis between a first folded position wherein the spoke is disposed substantially parallel to the axis of the hub and a second deployed position wherein the spoke extends radially of the hub,
a plurality of rim elements interconnected in end to end relation to one another and the outer ends of the spokes and including second joint means pivotable about only a single axis for pivotally connecting each of the rim elements directly to a spoke and a pair of third joint means for pivotally connecting adjacent rim elements to each other at ends remote from the spokes, each of said third joint means being pivotable about only a single axis, pairs of the second joint means having axes substantially coincident when the spokes are deployed, thereby permitting movement of the rim elements between a first folded position wherein the rim elements are disposed substantially parallel to the spoke connected thereto and a second deployed position wherein the rim elements extend laterally from the spokes independent of movement of others of said spokes and rim elements, and pairs of the third joint means having axes substantially coincident with an axis of one of the first joint means when the rim elements are folded, thereby permitting folding of spokes in unison with adjacent rim elements pivotally connected thereto independent of folding of others of said spokes and rim elements.

9. A foldable space station of closed geometric configuration comprising:
a plurality of hollow rigid rim elements arranged in end to end relation and providing junctions between adjoining ends of adjacent rim elements;
a hollow hub;
a plurality of hollow rigid spokes, each of said spokes interconnecting said hub and one of the ends of each of a pair of said rim elements, the other end of each of said rim elements being remote from said spokes;
means for pivoting each of said spokes and a pair of rim elements relative to said hub independent of pivotal motion of others of said spokes and rim elements;
means for pivoting a different pair of said rim elements relative to said spokes independent of pivotal motion of said spokes and others of said rim elements; and
means for sealing the junctions between adjacent rim elements and between said rim elements and spokes during pivoting motion.

10. A foldable structure comprising:
a hub;
a plurality of rigid inextensible spoke members connected to said hub;
a plurality of interconnected rigid rim elements connected at alternate pairs of ends to said spoke members; and
a plurality of single pivot axis joint means for pivoting said spoke members and rim elements between a folded position, an intermediate position and a deployed position, wherein
aid folded position has said spoke members and said rim elements all disposed parallel to and juxtaposed with each other,
said intermediate position has said spoke members and said rim elements all disposed radially from said hub, substantially normal to their disposition in the folded position, and has a pair of rim elements disposed parallel to each of said spoke members, and
said deployed position has said spoke members all disposed radially from said hub and said rim elements all disposed as peripheral segments of a substantially rotiform structure.

11. A foldable structure comprising:
a hub;
three rigid spokes;
first joint means pivotally connecting one end of each of said spokes to said hub for movement directly between a first folded position wherein said spokes are disposed substantially parallel to one another and a first deployed position wherein said spokes extend radially from said hub at substantially equally spaced intervals around said hub;
six substantially similar rigid rim elements arranged in generally end to end relation to one another for forming a six sided figure in a second deployed position, said rim elements and said spokes being of substantially similar length;

second joint means connecting one end of each of said rim elements to the other end of one of said spokes, pairs of said second joint means connecting adjacent ones of said spokes to adjacent ones of said rim elements having pivot axes substantially coincident when said spokes are in said first deployed position for movement of said adjacent rim elements directly between a second folded position wherein said rim elements are disposed substantially parallel to the respective spoke connected thereto and the second deployed position wherein said rim elements extend laterally from said spokes, independent of movement of others of said rim elements;

three interconnecting members, one of said interconnecting members being arranged generally between adjacent ends of each pair of rim elements remote from the ends thereof connected to said spokes;

third joint means pivotally connecting each of said interconnecting members and each of the pair of rim elements associated therewith, pairs of said third joint means having pivot axes substantially coincident with an axis of one of said first joint means when said rim elements are in the second folded position for movement directly between the first folded position and the first deployed position so that the rim elements adjacent each spoke can move in unison therewith independent of movement of others of said rim elements and said spokes.

12. A foldable structure as defined in claim 11 wherein said rim elements, spokes, and interconnecting members are hollow and wherein said second and third joint means are rotary joints each pivoting about a single axis and further comprising:

means for maintaining sealing each of said second and third joint means during movement between the folded and deployed positions.

13. A foldable structure of closed geometric configuration comprising:

a plurality of rim elements arranged in end to end relation and having junctions between adjoining ends of adjacent elements, a hub, and a plurality of rigid spokes, each spoke being connected to the hub by a pivotal connection including means for limiting pivoting to a single axis and connected to adjoining ends of each of a different pair of adjacent rim elements at alternate ones of said junctions by a pivotal connection including means for limiting pivoting between each of said spokes and each of the corresponding rim elements connected thereto to a single axis, the axes of the pivotal connections between mutually remote ends of a pair of adjacent rim elements and their associated spokes being coincident, whereby said pair of rim elements may fold as a unit relative to their associated spokes to and from an intermediate position wherein the structure is partly folded independent of folding of others of said rim elements and spokes.

14. The structure of claim 13, including pivotal connections between adjacent rim elements at junctions between said alternate junctions, each of said pivotal connections including means for limiting pivoting to a pair of mutually angulated single axes and wherein in said intermediate position the axis of the pivotal connection between one spoke and the hub is coincident with the axes of the pivotal connections of each rim element connected to said one spoke and its adjacent rim element remote from said one spoke.

References Cited

UNITED STATES PATENTS

| | | | |
|---|---|---|---|
| 459,644 | 9/1891 | McCandless | 135—2 X |
| 1,326,006 | 12/1919 | Sterhardt | 135—4 |
| 2,137,625 | 11/1938 | Norvell | 135—4 |
| 3,047,259 | 7/1962 | Tatnall et al. | 244—1 X |
| 3,169,725 | 2/1965 | Berglund | 244—1 |
| 3,232,561 | 2/1966 | Adams | 244—1 |

FOREIGN PATENTS

| | | |
|---|---|---|
| 6,423/32 | 3/1933 | Australia. |
| 667,280 | 11/1938 | Germany. |
| 127,005 | 6/1959 | U.S.S.R. |

FRANK L. ABBOTT, *Primary Examiner.*

R. S. VERMUT, *Assistant Examiner.*